United States Patent
Passmore et al.

(10) Patent No.: US 12,123,282 B2
(45) Date of Patent: Oct. 22, 2024

(54) ELECTRO-MECHANICAL CLUTCH FOR DOWNHOLE TOOLS

(71) Applicant: Halliburton Energy Services, Inc., Houston, TX (US)

(72) Inventors: Kevin Robin Passmore, Carrollton, TX (US); Nicholas Robert Wood, Carrollton, TX (US); Rajiv Jerome Yatawara, Carrollton, TX (US); Bruce Edward Scott, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 17/884,855

(22) Filed: Aug. 10, 2022

(65) Prior Publication Data

US 2024/0052722 A1   Feb. 15, 2024

(51) Int. Cl.
*E21B 34/06*  (2006.01)
*F16H 25/20*  (2006.01)

(52) U.S. Cl.
CPC ........... *E21B 34/066* (2013.01); *F16H 25/20* (2013.01)

(58) Field of Classification Search
CPC ........ E21B 34/066; E21B 23/00; F16H 25/20; F16D 2011/002; F16D 2011/006
See application file for complete search history.

(56) References Cited

U.S. PATENT DOCUMENTS

| | | | | |
|---|---|---|---|---|
| 2,857,776 A | * | 10/1958 | Steere | F16H 35/10 248/419 |
| 4,015,491 A | | 4/1977 | Peter | |
| 4,526,505 A | | 7/1985 | Mally et al. | |
| 4,598,238 A | | 7/1986 | Scarano | |
| 5,375,659 A | * | 12/1994 | Gilbert | E21B 23/02 166/162 |
| 6,041,857 A | * | 3/2000 | Carmody | E21B 34/066 166/324 |
| 6,148,843 A | * | 11/2000 | Pringle | E21B 43/123 137/155 |
| 6,253,843 B1 | * | 7/2001 | Rawson | E21B 34/066 166/332.8 |
| 6,433,991 B1 | | 8/2002 | Denton et al. | |

(Continued)

FOREIGN PATENT DOCUMENTS

CN  202559084 U  11/2012
CN  206628398 U  11/2017

(Continued)

OTHER PUBLICATIONS

International Search Report and Written Opinion for International Patent Application No. PCT/US2022/041848 dated May 2, 2023.

(Continued)

*Primary Examiner* — Jennifer H Gay
(74) *Attorney, Agent, or Firm* — Scott Richardson; C. Tumey Law Group PLLC

(57) ABSTRACT

Systems and methods of the present disclosure relate to actuator assemblies for downhole tools. An actuator assembly comprises a ball screw; a ball nut disposed around the ball screw; a cam disposed around the ball nut; a rail disposed adjacent to the cam, the rail operable to stop rotation of the cam to extend the cam axially as the ball nut traverses the ball screw.

20 Claims, 12 Drawing Sheets

(56) References Cited

U.S. PATENT DOCUMENTS

| | | | |
|---|---|---|---|
| 6,619,388 B2 * | 9/2003 | Dietz | E21B 34/066 |
| | | | 166/66 |
| 8,464,799 B2 * | 6/2013 | Scott | E21B 34/16 |
| | | | 166/373 |
| 10,480,284 B2 * | 11/2019 | Watson | E21B 34/066 |
| 10,670,160 B2 * | 6/2020 | Phelps | E21B 34/066 |
| 11,371,318 B2 * | 6/2022 | Hopmann | H02K 7/06 |
| 11,867,263 B2 * | 1/2024 | Lee | E21B 23/06 |
| 2002/0108747 A1 * | 8/2002 | Dietz | E21B 34/066 |
| | | | 166/66.4 |
| 2003/0094056 A1 * | 5/2003 | Park | F16H 25/2209 |
| | | | 74/89.42 |
| 2007/0056724 A1 | 3/2007 | Spring et al. | |
| 2007/0199556 A1 | 8/2007 | Murai et al. | |
| 2011/0186303 A1 * | 8/2011 | Scott | E21B 34/08 |
| | | | 166/373 |
| 2017/0002945 A1 * | 1/2017 | Phelps | E21B 34/066 |
| 2018/0171751 A1 * | 6/2018 | Watson | E21B 34/10 |
| 2019/0017619 A1 | 1/2019 | Gagliano et al. | |
| 2019/0309601 A1 | 10/2019 | Grieco et al. | |
| 2020/0392810 A1 * | 12/2020 | Segura | E21B 34/066 |
| 2020/0392811 A1 | 12/2020 | Vick, Jr. et al. | |
| 2020/0392812 A1 | 12/2020 | Vick, Jr. et al. | |
| 2021/0062614 A1 * | 3/2021 | Hopmann | F16H 25/24 |
| 2022/0316299 A1 * | 10/2022 | Hopmann | F16H 25/24 |
| 2023/0358300 A1 * | 11/2023 | Lee | F16H 25/2204 |
| 2023/0417123 A1 * | 12/2023 | Wood | E21B 34/16 |
| 2023/0417124 A1 * | 12/2023 | Wood | E21B 34/16 |
| 2023/0417125 A1 * | 12/2023 | Wood | E21B 34/08 |
| 2024/0052722 A1 * | 2/2024 | Passmore | E21B 41/00 |
| 2024/0060393 A1 * | 2/2024 | Scott | F16D 23/00 |

FOREIGN PATENT DOCUMENTS

| | | | |
|---|---|---|---|
| CN | 108043141 A | | 5/2018 |
| CN | 114593147 A | * | 6/2022 |
| CN | 115230572 A | * | 10/2022 |
| EP | 2208854 | | 7/2010 |
| JP | 2010179323 A | | 8/2010 |
| WO | 2015148841 | | 10/2015 |
| WO | 2021041783 | | 3/2021 |
| WO | WO-2022197666 A1 * | 9/2022 | ........... E21B 34/066 |

OTHER PUBLICATIONS

Netherlands Search Report and Written Opinion for NL Patent Application No. 2035030 dated Nov. 22, 2023. English Machine Translation, PDF file. 10 pages.

* cited by examiner

ELECTRO-MECHANICAL CLUTCH FOR DOWNHOLE TOOLS

BACKGROUND

Subsurface safety valves are commonly installed in tubing strings in wells to prevent high pressure formation fluids to the surface. These subsurface safety valves are operable to shut in production from the formation in response to dangerous conditions. Some of these valves may be controlled with a linear actuator.

Currently, configurations for linear actuators of these valves include a clutch. However, due to size and power limitations, torque requirements for the clutch may not be achieved. Also, the eventual power consumption and high temperatures may affect reliability of the clutch.

BRIEF DESCRIPTION OF THE DRAWINGS

These drawings illustrate certain aspects of some examples of the present disclosure and should not be used to limit or define the disclosure.

DETAILED DESCRIPTION

Figure 1:
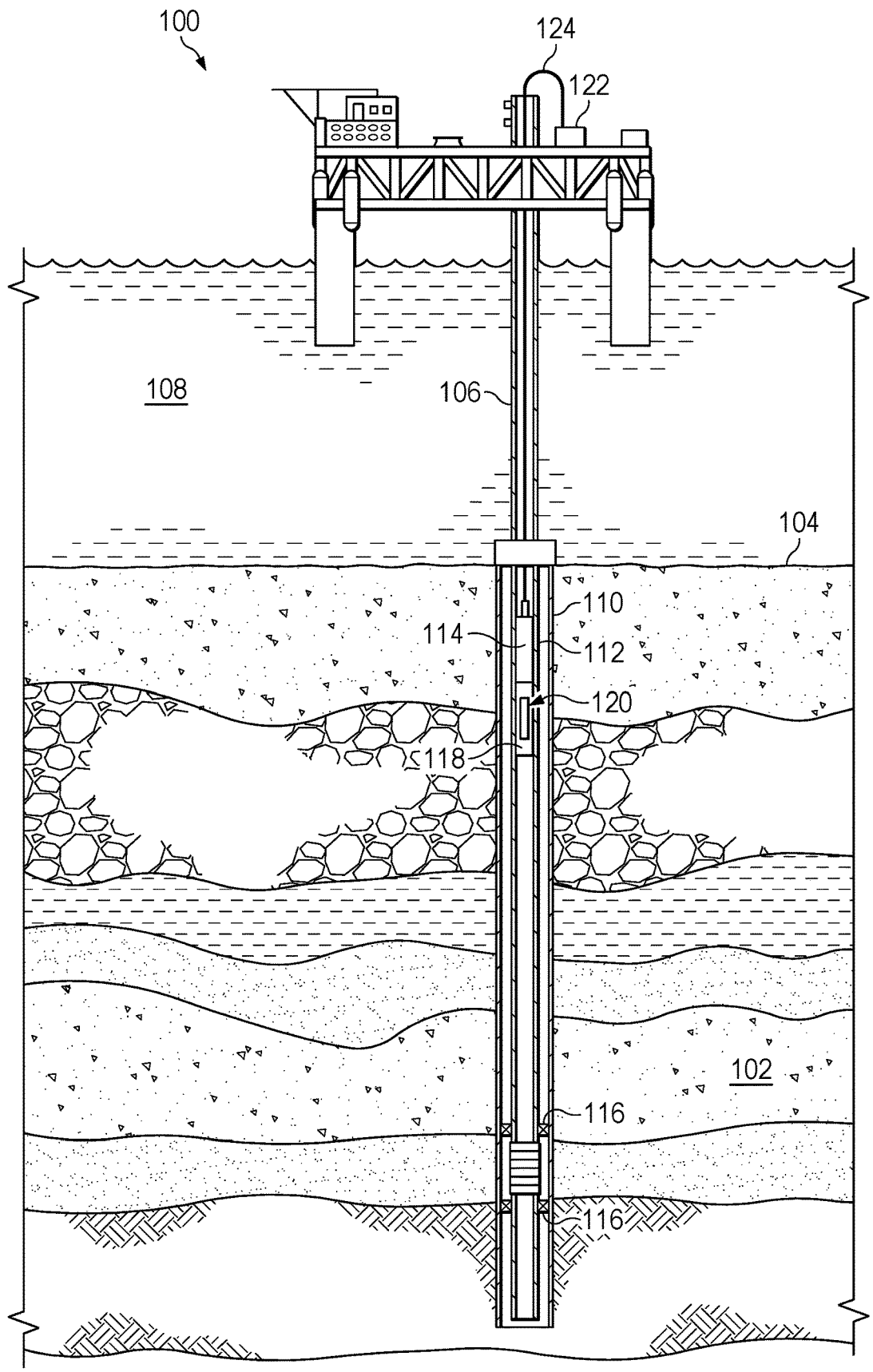
FIG. 1 illustrates an operating environment for an actuator assembly for an electro-mechanical clutch for downhole tools, in accordance with examples of the present disclosure.

The present disclosure relates to an actuator assembly including a cammed ball screw for electro-mechanical assemblies such as subsurface safety valves, for example. Other examples may include devices in which it is desired to open (extend) to a certain point and then close (retract) when power is removed.

Examples as described herein may replace the electromagnetic clutch and brake in electric actuators for downhole tools (e.g., valves). In particular examples, a cam may be an exterior portion of a ball nut that is disposed around the ball screw. The ball nut/cam may be part of a ball nut assembly whose major components are the ball nut (with cam) and output shaft. The proposed system uses a minimum number of electrical components which reduces the power requirements of the electric actuator in the overall system. The system removes the holding load from the actuator to the guide rod assembly which reduces the stress on the actuator components.

To open the valve assembly, the solenoid may be powered and closed or un-powered and open, and the cam rotates to catch a rail that is disposed (e.g., spring-loaded) within a track. For example, a motor rotates the ball screw within the ball nut/cam. Rotation of the ball screw causes rotation of the ball nut/cam until the shoulder of the cam catches/contacts the rail. Upon contact, the ball nut/cam ceases to rotate and begins to slide axially along the rail extending the output shaft portion of the ball nut assembly, thereby causing the flow tube of the subsurface safety valve assembly to translate downward opening the subsurface safety valve.

A guide rod with piston seals is adjacent to the cam and moves in tandem with the cam. For example, the guide rod and the cam may move in parallel directions simultaneously. If the solenoid is powered and closed during valve opening, fluid will enter the guide rod chamber through the check valve; if the solenoid is un-powered and open during valve opening fluid will enter the guide rod chamber through either the check valve or the open solenoid. When the cam is fully extended, a solenoid valve on the back side of a piston seal(s) is powered on and closed to keep the valve open.

The closed solenoid creates a closed volume between the solenoid and the piston seals which keeps the valve open. The volume of fluid extends from the solenoid to the guide rod assembly. A check valve allows fluid into a closed volume while the guide rod is being extended. The guide rod is used with a standard electric actuator without a brake. The solenoid with the closed volume replaces the standard brake.

To close the valve, power is removed from the solenoid which opens the closed volume (e.g., releases pressure/fluid). The ball nut/cam assembly is then able to be spun in the opposite direction to retract the ball nut/cam assembly. The ability of the ball screw to spin in the opposite direction is restricted by the gearing. The limited reverse spinning of the ball screw and the force exerted on the output shaft of the ball nut/cam assembly causes the ball nut/cam assembly to spin on the ball screw. During retraction, the ball nut/cam assembly spins in the opposite direction of when the ball nut/cam assembly are extending. A spring may be disposed beneath the rail within the track and as the ball nut/cam assembly spins in the opposite direction, the spring under the rail is compressed as the cam feature rotates to push the rail (downward and out of the way) such that the cam is not able to catch the rail during retraction, thereby allowing the valve to return to the fully closed position.

In other examples, the rail may include pins that slide down slots of the track such that the rail is moved downward such that the cam is unable to catch the rail during retraction of the cam, rather than the spring as discussed above. Also, in some examples, the actuator assembly includes a lower track that is operable to engage a poppet valve that is in fluid communication with a closed fluid volume. The volume of fluid may be bound by the poppet valve and a solenoid.

FIG. 1 illustrates an operating environment for a downhole tool such as a safety valve, in accordance with examples of the present disclosure. It should be noted that while FIG. 1 generally depicts an offshore installation, those skilled in the art may recognize that the principles described herein are equally applicable to land-based operations, without departing from the scope of the disclosure.

A semi-submersible platform 100 is centered over a submerged oil and gas formation 102 located below sea floor 104. Well 106 extends through the water 108 and penetrates the formation 102 that includes a wellbore 110. Disposed within the wellbore 110 is casing 112. Disposed within the casing 112 is production tubing 114. Seals 116 provide a seal between the tubing 114 and the casing 112. During production, formation fluid enters the wellbore 110 via perforations. Coupled within tubing 114 is a valve 118 (e.g., downhole tool). The valve 118 may include an actuator assembly 120 and may be in communication with a control system 122 to control/power the valve 118 via a wireline 124.

Figure 2:
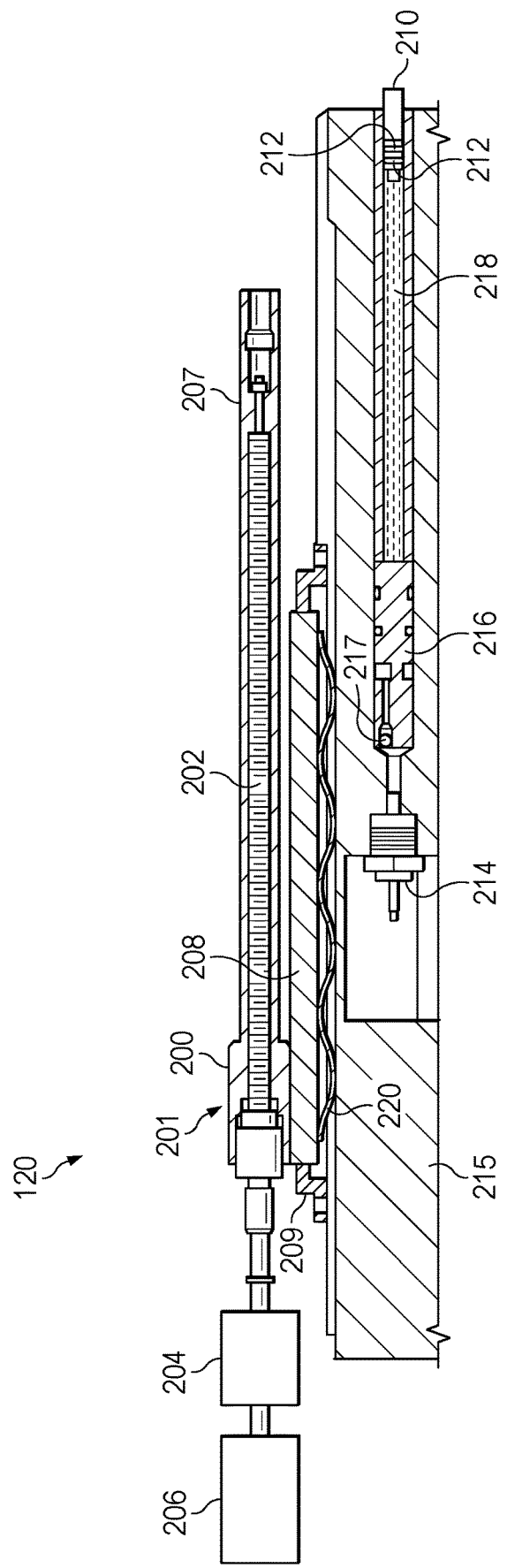
FIG. 2 illustrates a side view of the actuator assembly, in accordance with examples of the present disclosure.

FIG. 2 illustrates a close-up view of the actuator assembly 120, in accordance with some examples of the present disclosure. The actuator assembly 120 may include a linear actuator. For example, a cam 200 may be an exterior portion of a ball nut 201 that is disposed around a ball screw 202 and threadedly coupled thereto. The cam 200 may include the external, increasing radius portion of the ball nut 201. The ball screw 202 may be coupled to a gearbox 204 and a motor 206. The actuator assembly 120 may also include a portion including an output shaft 207 extending from the ball nut/cam.

Upon rotation of the motor 206 and the gearbox 204, the cam 200 may catch a rail 208 that is disposed (e.g., spring loaded) within a track 209. For example, the motor 206 rotates the ball screw 202 within the cam 200. Rotation of the ball screw 202 causes rotation of the cam 200 until the cam catches/contacts the rail 208. Upon contact, the cam 200 ceases to rotate and the ball nut/cam assembly begins to slide axially forward along the rail 208 to open the valve (e.g., the valve 118 on FIG. 1).

A guide rod 210 with piston seals 212 is adjacent to the cam 200 and moves in tandem with the cam 200. When the ball nut/cam assembly 200 is fully extended, a normally open solenoid 214 on the back side of a piston 216 is powered on and closed. The solenoid 214 may control movement of the guide rod 210.

The closing of the solenoid 214 creates a closed volume of fluid 218 between the solenoid 214 and the piston seals 212 which prevents the valve from being able to close. The guide rod 210 and related components may be disposed in a housing 215 adjacent/beneath the rail 208. While extending to open the valve, the solenoid 214 may be powered and closed.

To close the valve, power is removed from the solenoid 214 which opens the closed volume 218 (e.g., releases pressure). The ball screw 202 is then able to be spun in the opposite direction for retraction of the cam 200. A spring 220 may be disposed beneath the rail 208 within the track 209 and as the ball nut/cam assembly 202 spins in the opposite direction, the spring 220 is compressed to push the rail (downward) such that the cam 200 is not able to catch the rail 208 during retraction. This allows the valve to return to the fully closed position.

Figure 3A:
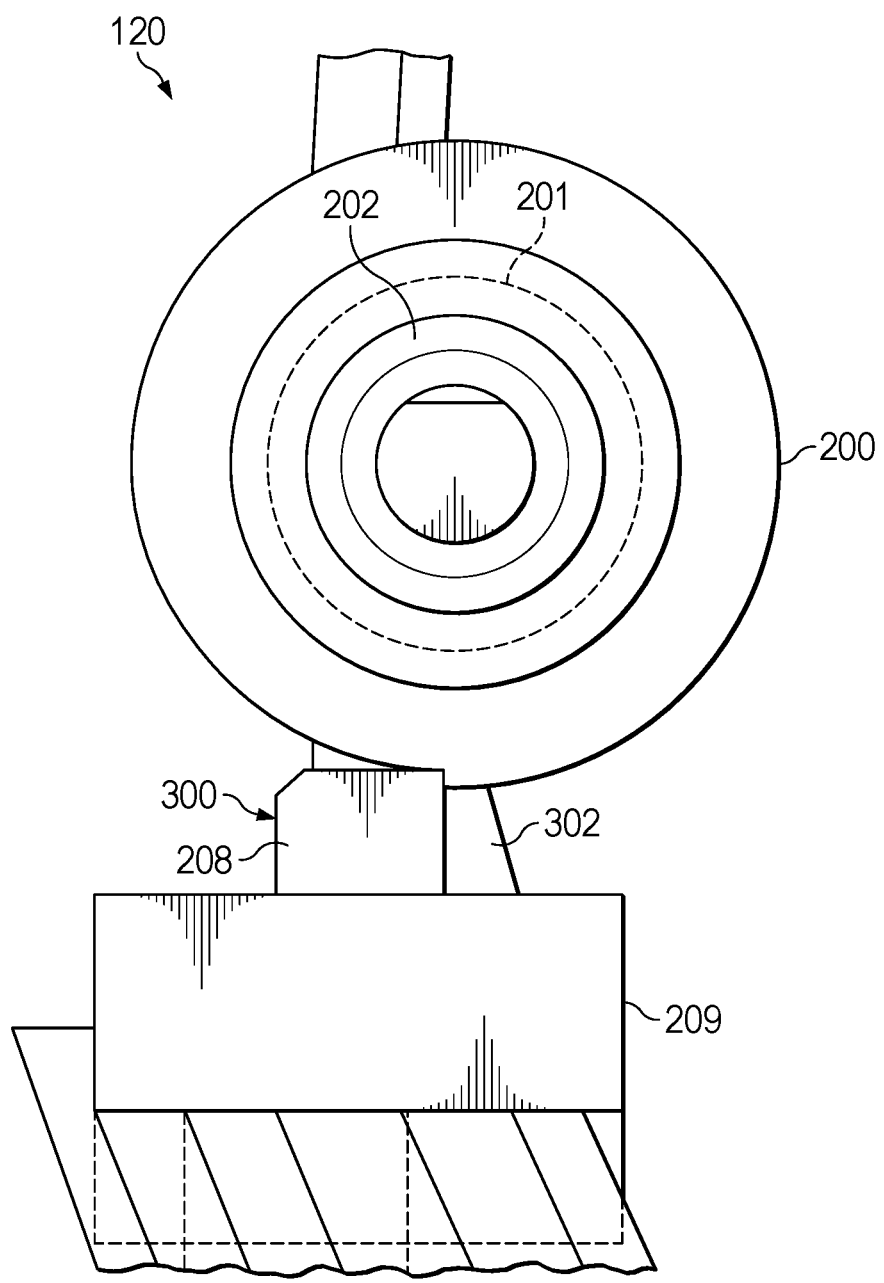
FIG. 3A illustrates a front view of the actuator assembly, in accordance with examples of the present disclosure.
Figure 3B:
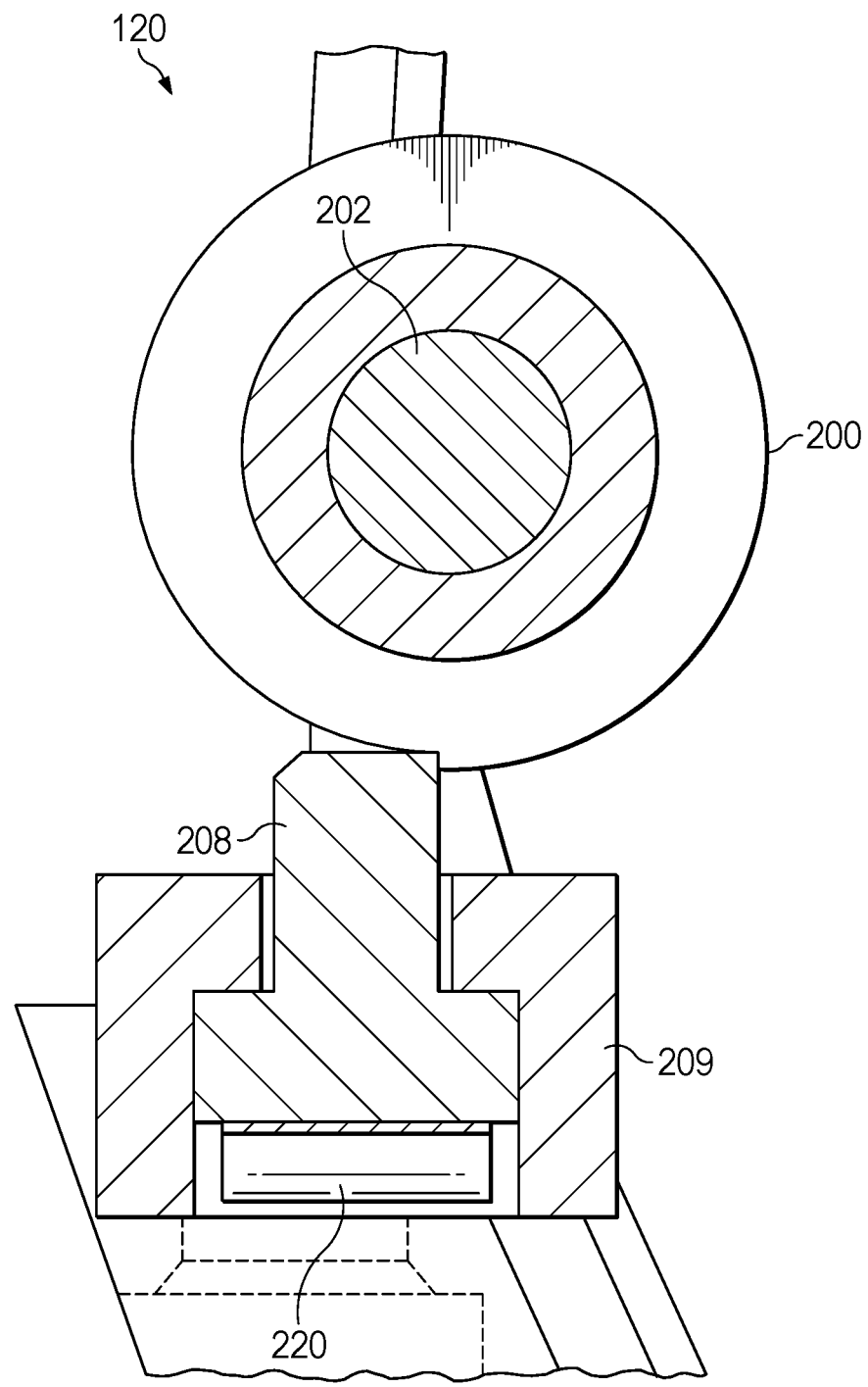
FIG. 3B illustrates a rear view of the actuator assembly, in accordance with examples of the present disclosure.

FIGS. 3A and 3B illustrate front and rear views of the actuator assembly 120, in accordance with examples of the present disclosure. As shown in the front view of FIG. 3A, the cam 200 may be an exterior portion of the ball nut 201 that is disposed around the ball screw 202 and threadedly coupled thereto. The ball screw 202 may be driven to rotate the cam 200 to catch the rail 208 that is disposed (e.g., spring loaded) within the track 209. For example, the motor 206 rotates the ball screw 202 within the cam 200.

Rotation of the ball screw 202 causes rotation of the cam 200 until the cam catches/contacts the rail 208. Upon contact, the cam 200 ceases to rotate and begins to slide axially forward along the rail 208. The rail 208 include an outer profile 300 such as a slant on one corner that causes the cam 200 to push the spring down during retraction so the cam 200 does not catch the rail 208. The cam 200 may include a profile 302 (e.g., protrusion) to catch a portion of the profile 300 (e.g., edge of corner) that stops rotation of the cam 200 to cause extension of the cam 200 via the ball screw 202.

With additional reference to the rear view of FIG. 3B, the ball screw 202 is also able to be spun in the opposite direction for retraction of the cam 200. A spring 220 may be disposed beneath the rail 208 within the track 209. As the valve closes, the ball nut/cam assembly will retract. Retraction of the ball nut/cam assembly may cause the ball nut/cam assembly to spin along the ball screw 202. The profile 302 of the cam 200 pushes the rail 208 to compress the spring 220 (downward) such that the cam 200 is not able to catch the rail 208. This allows retraction of the cam 200 as the valve closes. The valve is then free to return to the fully closed position.

Figure 3C:
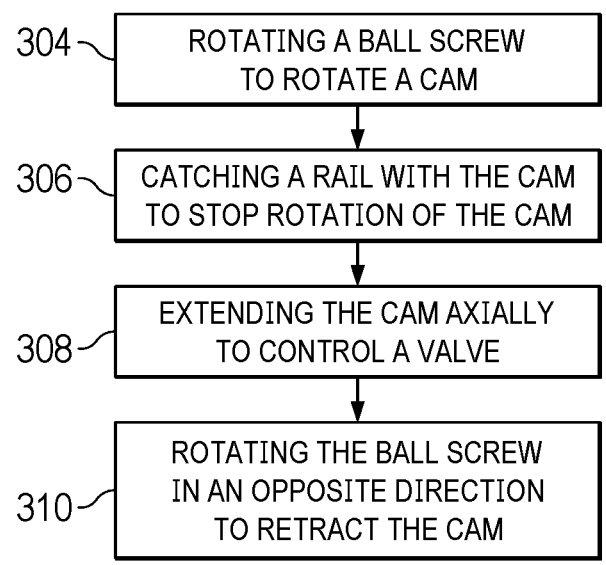
FIG. 3C illustrates an operative flow chart for the actuator assembly of FIGS. 2-3B, in accordance with examples of the present disclosure.
Figure 4:
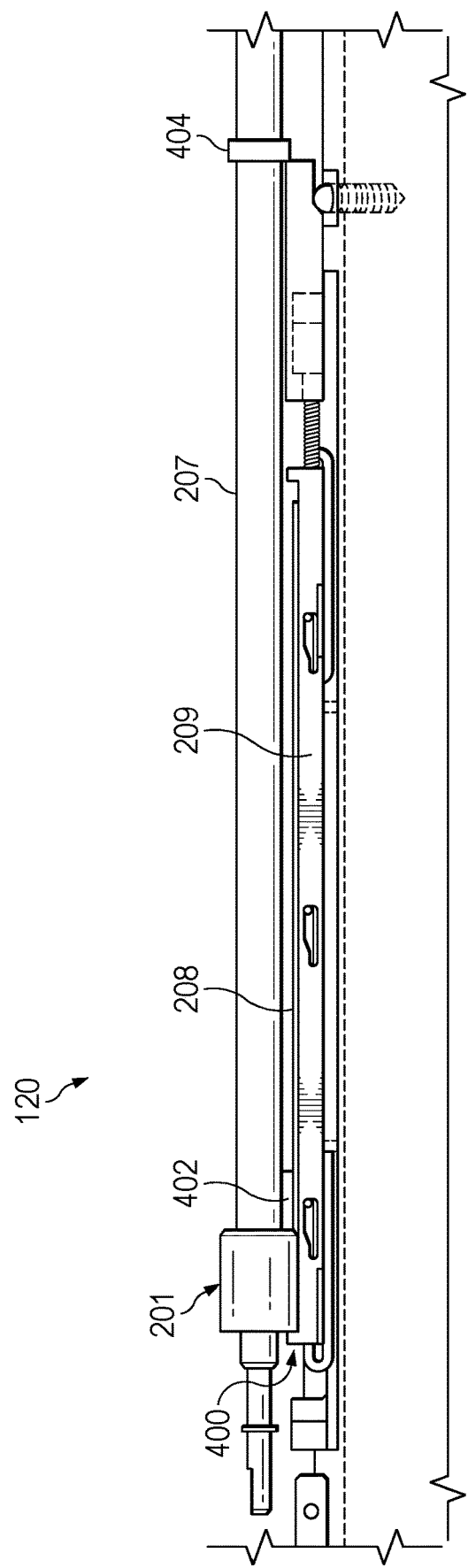
FIG. 4 illustrates a side view of an alternative actuator assembly, in accordance with examples of the present disclosure.
Figure 5:
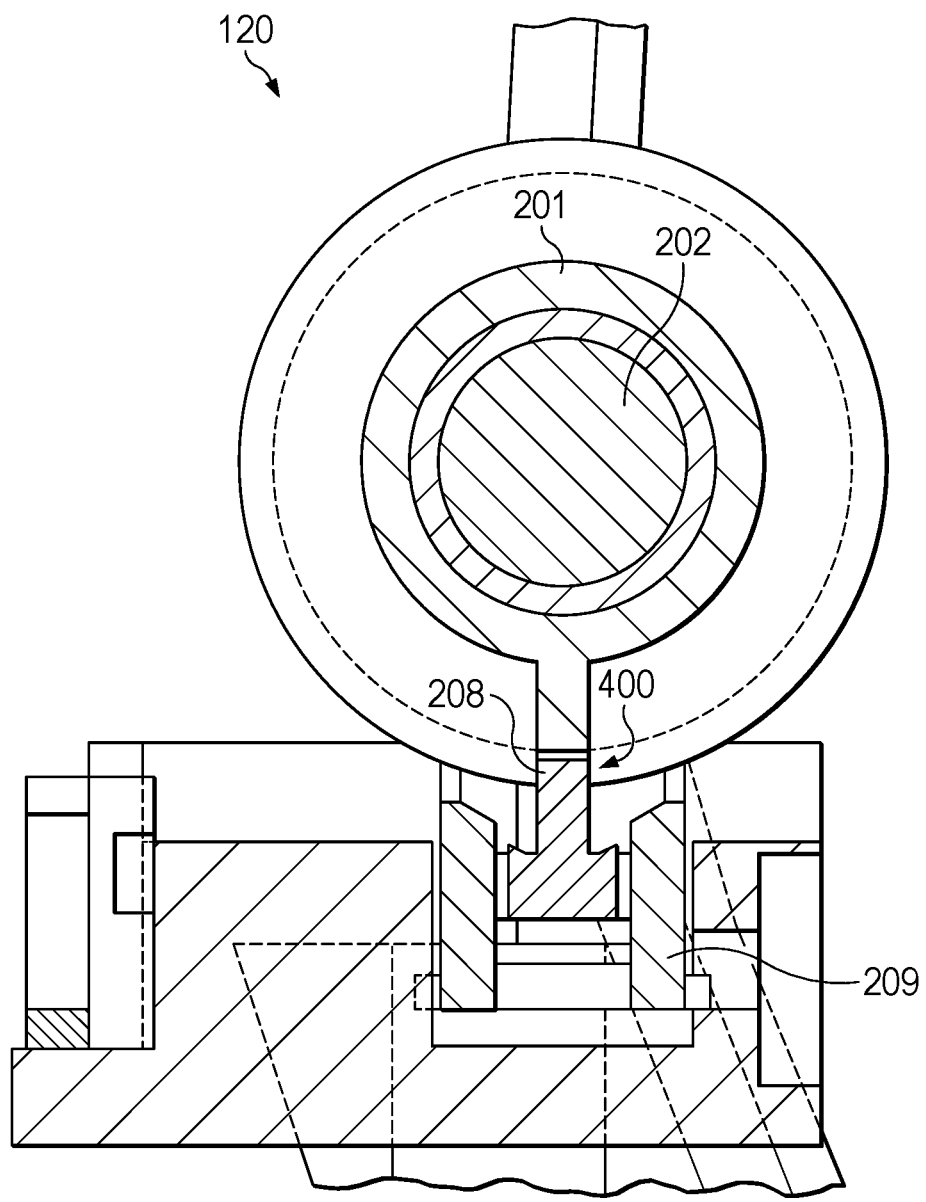
FIG. 5 illustrates a front view of the alternative actuator assembly, in accordance with examples of the present disclosure.

FIG. 3C illustrates an operative sequence for the actuator assembly 120, in accordance with examples of the present disclosure. At step 304, to open the valve, a ball screw is rotated to rotate a cam that is disposed around the ball screw. For example, as shown on FIGS. 2-3B, the actuator assembly 100 may include a linear actuator. The cam 200 may be an exterior portion of a ball nut 201 that is disposed around a ball screw 202 and threadedly coupled thereto. The ball screw 202 may be coupled to the gearbox 204 and the motor 206.

Upon rotation of the motor 206 and the gearbox 204, the cam 200 may catch the rail 208 that is disposed (e.g., spring loaded) within the track 209. For example, the motor 206 rotates the ball screw 202 within the cam 200. Rotation of the ball screw 202 causes rotation of the cam 200 until the cam catches/contacts the rail 208.

At step 306, the cam catches a rail and ceases to rotate. Upon contact, the cam ceases to rotate and begins to slide axially forward along the rail (e.g., see FIG. 2) to open the valve. At step 308, the ball screw continues to rotate to axially extend the cam. A guide rod with piston seals is adjacent to the cam and moves in tandem with the cam. While extending to open the valve, the solenoid may be powered and closed.

For example, as shown on FIG. 2, the guide rod 210 and the cam 200 may move. When the cam 200 is fully extended, a normally open solenoid 214 on the back side of a piston assembly 216 is powered on and closed. The piston assembly 216 may include a check valve 217 to allow fluid into a closed volume 218 while the guide rod 210 is being extended. The solenoid 214 may control movement of the guide rod 210. The closing of the solenoid 214 along with the check valve 217 creates the closed volume 218 between the solenoid 214 and the piston seals 212 which prevents the valve from being able to close.

At step 310, to close the valve, power is removed from the solenoid which opens the closed volume (e.g., releases pressure). The ball screw may spin in the opposite direction. The cam may spin along the ball screw to retract the cam. At step 310 a spring beneath the rail allows the rail to translate downward as the cam spins in the opposite direction (from the extending direction) along the rail without being caught by the rail (e.g., FIGS. 3A and 3B). This allows the ball nut/cam to retract. The spring may be disposed beneath the rail within the track and as the ball nut/cam spins in the opposite direction, the spring under the rail is compressed to push the rail (downward) such that the cam is not able to catch the rail during retraction as the ball screw rotates in the opposite direction. This allows the valve to return to the fully closed position.

FIGS. 4-9 illustrates another example of the actuator assembly 120. As shown on FIG. 4, the ball nut 201 may move along the rail 208 extending longitudinally along the actuator assembly 120 within the track 209. The ball nut 201 may have a groove 400 in which the rail 208 is situated. The ball nut 201 may have a tab or protrusion 402 that can enter a groove 702 of the lower track 606 (e.g., see FIG. 7). The output shaft 207 may include a feature 404 (e.g., a protrusion) to reset the lower track 606. The rail 400 may extend within the track 209. With additional reference to a front view of FIG. 5, the ball nut 201 may move forward along the rail 208 as the ball screw 202 spins causing the ball nut 201 to move forward. At the end of extension, the rail 400 has been forced out of position.

Figure 6:
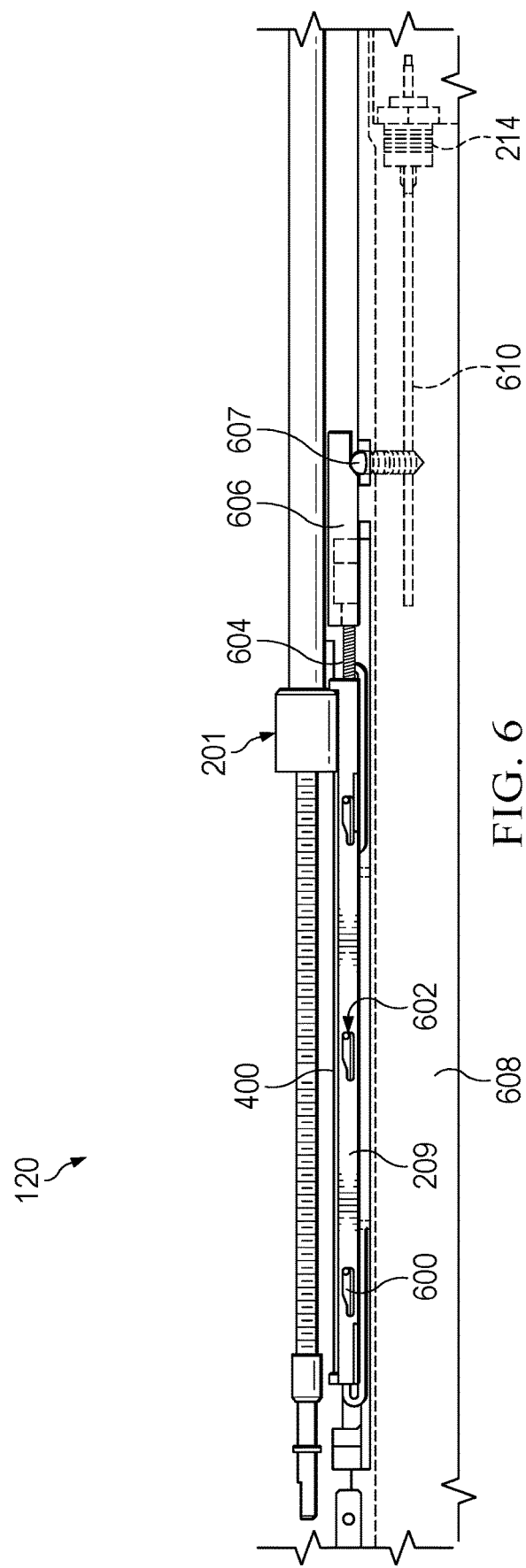
FIG. 6 illustrates pins of the alternative actuator assembly, in accordance with examples of the present disclosure.

FIG. 6 illustrates pins of the actuator assembly 120, in accordance with examples of the present disclosure. As set forth above, the ball nut 201 moves forward along the rail 208 as the ball screw 202 spins to open the valve. Pins 600 extending laterally from the rail 208 may move in slots 602 of the track 209 to push the rail 208 downward as the ball nut 201 moves forward to compress a spring 604.

The spring 604 compresses and pushes a lower track 606 to actuate a poppet 607 that is disposed beneath the lower track 606 within a housing 608. The housing 608 may include a closed volume 610 of fluid that is in communication with a closed solenoid 214. While extending to open the valve, the solenoid 214 is powered and closed and fluid chamber 610 if full of fluid.

Figure 7:
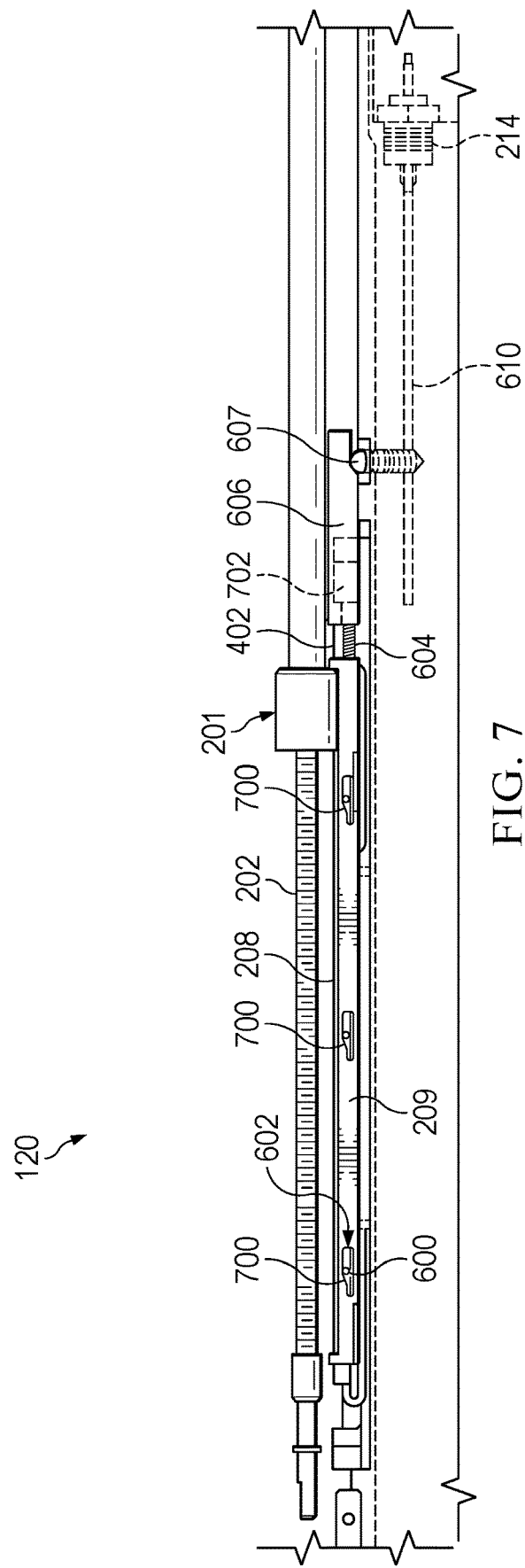
FIG. 7 illustrates that the pins are operable to move a rail of the assembly downward within a track, in accordance with examples of the present disclosure.

FIG. 7 illustrates that the pins 600 of the actuator assembly 120 are operable to ride along ramps 700 of the slots 602 to move the rail 208 downward within the track 209. As the ball nut 201 moves forward along the rail 208, the ball nut reaches the end of the track 209 causing the track 209 to translate forward compressing spring 604. As the rail 208 moves forward, the ramps 700 of track 209 move forward.

The pins 600 move downward after the ball nut 201 pushes the track 209 forward to compress the spring 604. A tab or protrusion on the ball nut 201 may enter a groove 702 of the lower track 606 which along with the gearing of the motor prevents the ball nut assembly from retracting. The lower track 606 is unable to compress the poppet 607 due to the locked fluid in chamber 610.

Figure 8:
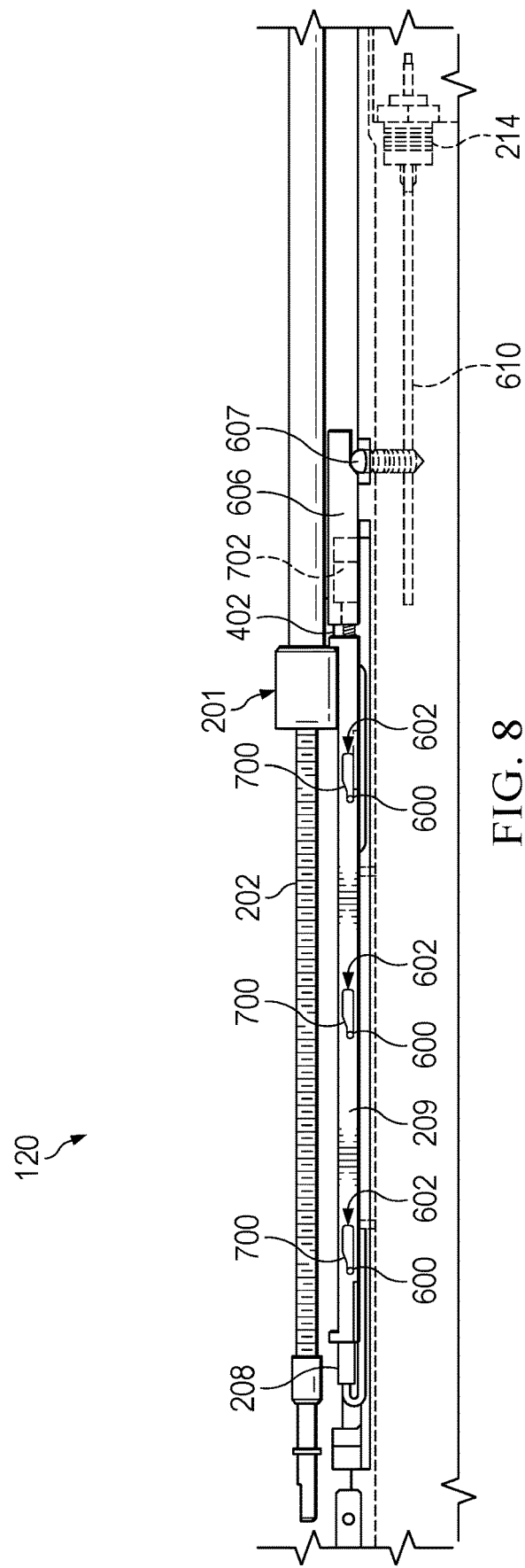
FIG. 8 illustrates that the pins have moved down along ramps of the track to move the rail, in accordance with examples of the present disclosure.

FIG. 8 illustrates that the pins 600 of the actuator assembly 120 have moved down along the ramps 700 of the slots 602 to move the rail 208 downward within the track 209. The pins 600 are positioned downward, and the ball nut 201 has pushed the track 209 forward to compress the spring 604. The tab or protrusion 402 on the ball nut 201 has entered a groove 702 of the lower track 606 which along with the gearing of the motor prevents the ball nut assembly from retracting.

Figure 9:
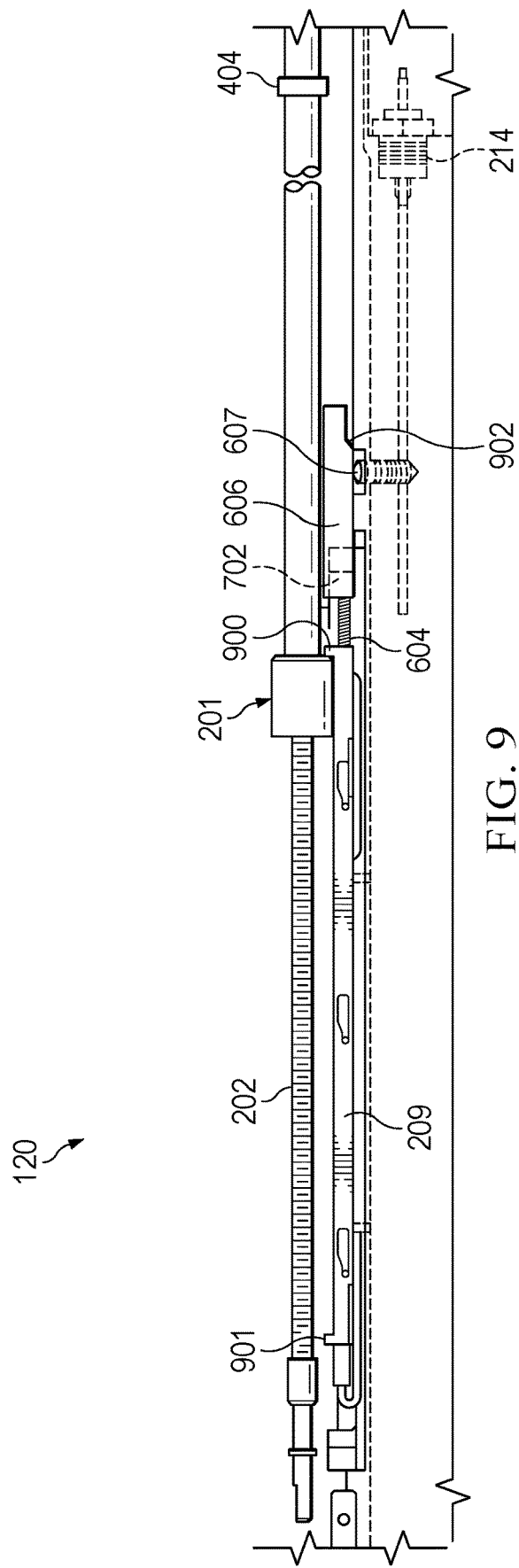
FIG. 9 illustrates that the track may include at least one tab to serve as a pushing point for a ball nut, in accordance with examples of the present disclosure.

FIG. 9 illustrates that the track 209 of the actuator assembly 120 may include a tab(s) 900 that may serve as a pushing point for the ball nut 201 as it moves the track 209 forward compressing spring 604 The lower track 606 may include a ramp 902 at a distal end to facilitate movement over the poppet 607. Power to the solenoid valve 214 is terminated allowing the valve closing sequence to commence. Upon termination of power to the solenoid, fluid is able to flow out of chamber 610 freeing the poppet 607 which in turn allows spring 604 to extend pushing the lower track 604 forward compressing the poppet 607. The spring 604 pushes the lower track 606 forward and the poppet 607 compresses, and the ball nut 201 exits the groove 702 of the lower track 606. The ball nut 201 rotates as it retracts along the stationary ball screw. As the ball nut 201 approaches full retraction, the ball nut 201 pushes on tab(s) 901 forcing track 209 to translate to the left. As track 209 translates to the left, the springs disposed under the rail 602 urge the rail 602 upward causing the pins 600 to follow the ramps 700 of the slots 602. As the ball nut 201 approaches full retraction, the feature 404 of the ball nut/cam assembly contacts the distal end of lower track 606, urging the lower track 606 to the left, allowing poppet 607 to reset adjacent to the ramp 902 of the lower track 606.

Figure 10:
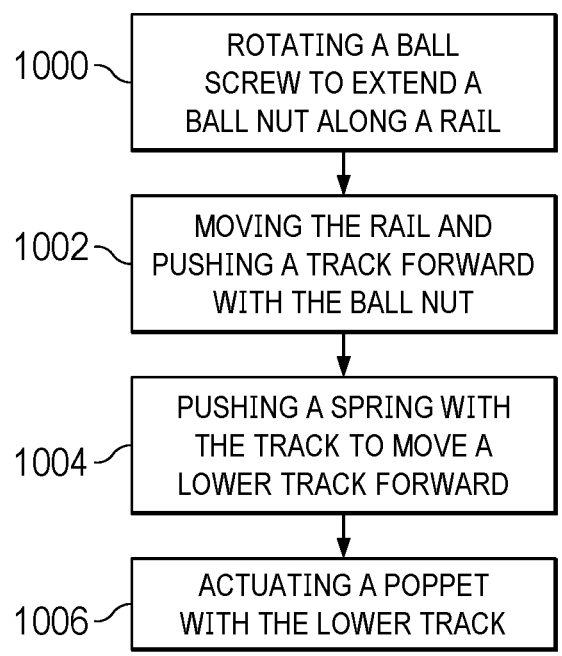
FIG. 10 illustrates an operational sequence for the actuator assembly of FIGS. 4-9, in accordance with examples of the present disclosure.

FIG. 10 illustrates an operative sequence for the actuator assembly 120 of FIGS. 4-9, in accordance with examples of the present disclosure. At step 1000, to open a valve, a ball screw is rotated to extend a ball nut along a rail that is disposed in a track (e.g., FIGS. 4-9). The ball nut rides along the rail. For example, as shown on FIG. 4, the ball nut 201 may move along the rail 208 extending longitudinally along the actuator assembly 120 within the track 209. The rail 400 may extend within the track 209. With additional reference to a front view of FIG. 5, the ball nut 201 may move forward along the rail 208 as the ball screw 202 spins causing the ball nut 201 to move forward. While extending to open the valve, the solenoid 214 is powered and closed.

At step 1002, pins of the rail slide down and the ball nut pushes the track forward and contacts a groove of a lower track. For example, as shown on FIG. 6, the pins 600 extending laterally from the rail 208 may move in slots 602 of the track 209. The rail 208 moves downward as the ball nut 201 pushes the track 209 forward. At step 1004, the track 209 compresses the spring 604 which pushes against the lower track 606.

At step 1006, the lower track pushes against a poppet which defines the extension limit of the ball nut extension. The valve is now open. For example, as shown on FIG. 9, the lower track 606 may include a ramp 902 at a distal end to facilitate movement over the poppet 607. Power to the solenoid 214 may be terminated to open the solenoid 214 removing the trapped pressure below the poppet to close the valve. Once the solenoid is opened, spring 604 forces the ramp of lower track 606 over the poppet 607 pushing the poppet 607 downward allowing lower track 606 to continue moving forward. The spring 604 pushes the lower track 606 and the poppet 607 compresses, and the tab of the ball nut 201 exits the groove 702 of the lower track 606. The main spring (not shown) of the valve assembly acting against the ball nut assembly causes the ball nut to retract. The ball nut will rotate as it retracts.

Accordingly, the systems and methods of the present disclosure allow for a ball-screw mechanism to control downhole tools such as for example, to actuate valves in wellbores. The systems and methods may include any of the various features disclosed herein, including one or more of the following statements.

Statement 1. An actuator assembly comprises a ball screw; a ball nut disposed around the ball screw; a cam disposed around the ball nut; a rail disposed adjacent to the cam, the rail operable to stop rotation of the cam to extend the cam axially as the ball nut traverses the ball screw.

Statement 2. The actuator assembly of the statement 1, wherein the rail is spring loaded.

Statement 3. The actuator assembly of the statement 1 or the statement 2, wherein the rail is disposed in a track.

Statement 4. The actuator assembly of any one of the statements 1-3, further comprising a housing, wherein the rail is disposed on the housing.

Statement 5. The actuator assembly of any one of the statements 1-4, further comprising a solenoid disposed in the housing.

Statement 6. The actuator assembly of any one of the statements 1-5, further comprising a guide rod disposed within the housing.

Statement 7. The actuator assembly of any one of the statements 1-6, further comprising a closed volume extending between the solenoid and piston seals of the guide rod.

Statement 8. An actuator assembly comprising: a ball screw; a ball nut disposed around the ball screw; a cam disposed around the ball nut; a rail disposed adjacent to the cam, the rail operable to guide axial movement of the ball nut and the cam as the ball screw rotates; a track, wherein the rail is disposed in the track.

Statement 9. The actuator assembly of the statement 8, wherein the track comprises slots.

Statement 10. The actuator assembly of the statement 8 or 9, wherein the rail comprises pins, the slots operable to receive the pins.

Statement 11. The actuator assembly of any one of the statements 8-10, further comprising another track, wherein a spring is disposed between the tracks.

Statement 12. The actuator assembly of any one of the statements 8-11, further comprising a housing, wherein the tracks are disposed on the housing.

Statement 13. The actuator assembly of any one of the statements 8-12, further comprising a poppet disposed adjacent to the another track.

Statement 14. The actuator assembly of any one of the statements 8-13, further comprising a solenoid disposed in the housing.

Statement 15. A method to control a downhole tool, the method comprising: rotating a ball screw to move a cam in an axial direction, wherein the cam is disposed around the ball screw; and actuating a solenoid to control a volume of fluid to move a guide rod, wherein the cam, the ball screw, and the guide rod are components of the downhole tool.

Statement 16. The method of any one of the statements 13-15, wherein rotation of the ball screw includes rotation of a ball nut, wherein the cam is adjacent to the ball nut.

Statement 17. The method of any one of the statements 13-16, further comprising stopping rotation of the cam to extend the cam axially.

Statement 18. The method of any one of the statements 13-17, wherein axial movement of the cam occurs along a rail.

Statement 19. The method of any one of the statements 13-18, further comprising compressing a spring adjacent to the rail during rotation of the ball screw.

Statement 20. The method of any one of the statements 13-19, wherein rotation of the ball screw controls a valve.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. An actuator assembly, comprising:
a ball screw;
a ball nut disposed around the ball screw;
a cam disposed around the ball nut;
a housing;
a solenoid disposed in the housing; and
a rail disposed adjacent to the cam and disposed on the housing,
wherein the rail is operable to stop rotation of the cam to extend the cam axially as the ball nut traverses the ball screw,
wherein the rail is spring loaded, and
wherein the rail is disposed in a track.

2. The actuator assembly of claim 1, further comprising: a guide rod disposed within the housing.

3. The actuator assembly of claim 2, further comprising; a closed volume extending between the solenoid and piston seals of the guide rod.

4. The actuator assembly of claim 1, further comprising: a second track.

5. The actuator assembly of claim 4, further comprising: a spring disposed between the track and the second track.

6. The actuator assembly of claim 4, further comprising: a poppet disposed adjacent to the second track.

7. An actuator assembly, comprising:
a ball screw;
a ball nut disposed around the ball screw;
a cam disposed around the ball nut;
a first track, comprising:
  pins; and
  slots operable to receive the pins;
a second track;
a spring disposed between the first track and the second track; and
a rail disposed adjacent to the cam and in the first track, wherein the rail is operable to guide axial movement of the ball nut and the cam as the ball screw rotates.

8. The actuator assembly of claim 7, further comprising: a housing, wherein the first track and the second track are disposed on the housing.

9. The actuator assembly of claim 8, further comprising: a poppet disposed adjacent to the second track.

10. The actuator assembly of claim 9, further comprising: a solenoid disposed in the housing.

11. The actuator assembly of claim 8, further comprising: a solenoid disposed in the housing.

12. The actuator assembly of claim 11, further comprising: a guide rod disposed within the housing.

13. The actuator assembly of claim 12, further comprising: a closed volume extending between the solenoid and piston seals of the guide rod.

14. A method to control a downhole tool, the method comprising:
rotating a ball screw to move a cam in an axial direction, wherein the cam is disposed around the ball screw, and wherein axial movement of the cam occurs along a rail; and
actuating a solenoid to control a volume of fluid to move a guide rod, wherein the cam, the ball screw, and the guide rod are components of the downhole tool.

15. The method of claim 14, wherein rotating the ball screw includes rotating a ball nut.

16. The method of claim 15, wherein the cam is adjacent to the ball nut.

17. The method of claim 14, further comprising: stopping a rotation of the cam to extend the cam axially.

18. The method of claim 14, further comprising: compressing a spring adjacent to the rail while rotating the ball screw.

19. The method of claim 14, wherein rotating the ball screw controls a valve.

20. The method of claim 14, wherein a closed volume extends between the solenoid and piston seals of the guide rod.

* * * * *